(12) United States Patent
Shirakawa et al.

(10) Patent No.: US 11,255,435 B2
(45) Date of Patent: Feb. 22, 2022

(54) GASKET AND METHOD FOR MANUFACTURING SAME

(71) Applicant: NOK CORPORATION, Tokyo (JP)

(72) Inventors: Sohei Shirakawa, Fujisawa (JP); Hajime Yui, Fujisawa (JP); Takayuki Horimoto, Fujisawa (JP); Hidetoshi Saso, Fujisawa (JP)

(73) Assignee: NOK CORPORATION

( * ) Notice: Subject to any disclaimer, the term of this patent is extended or adjusted under 35 U.S.C. 154(b) by 302 days.

(21) Appl. No.: 16/333,530

(22) PCT Filed: Sep. 21, 2017

(86) PCT No.: PCT/JP2017/034102
§ 371 (c)(1),
(2) Date: Mar. 14, 2019

(87) PCT Pub. No.: WO2018/079143
PCT Pub. Date: May 3, 2018

(65) Prior Publication Data
US 2019/0257426 A1    Aug. 22, 2019

(30) Foreign Application Priority Data

Oct. 27, 2016 (JP) .............................. JP2016-210340
Oct. 27, 2016 (JP) .............................. JP2016-210341

(51) Int. Cl.
*F16J 15/12* (2006.01)
*F16J 15/10* (2006.01)
(Continued)

(52) U.S. Cl.
CPC ............. *F16J 15/104* (2013.01); *B29C 45/14* (2013.01); *B29C 45/1418* (2013.01);
(Continued)

(58) Field of Classification Search
CPC .......... F16J 15/104; F16J 15/10; F16J 15/108; B29C 45/14; B29C 45/1418;
(Continued)

(56) References Cited

U.S. PATENT DOCUMENTS 3,619,458 A    11/1971  Engelhardt
4,635,949 A  *  1/1987  Lucas ................ F16J 15/123
                                              277/595
(Continued)

FOREIGN PATENT DOCUMENTS

CN    201520303 U    7/2010
CN    204533520 U    8/2015
(Continued)

OTHER PUBLICATIONS

Extended European Search Report for Patent Application No. EP 17865080.0 dated Sep. 4, 2019 (10 pages).

*Primary Examiner* — Gilbert Y Lee
(74) *Attorney, Agent, or Firm* — Harness, Dickey & Pierce, P.L.C.

(57) ABSTRACT

A gasket includes a reinforcing body made of a resin film, a one-side gasket body on one surface of the reinforcing body, and another-side gasket body on another surface of the reinforcing body. The reinforcing body has, between both gasket bodies, a three-dimensional shape in which the resin film is bent. The one-side gasket body includes an inversely-tapered engaging convex portion protruding toward the other-side gasket body, the reinforcing body includes a deformation portion as the three-dimensional shape deforming along a shape of the engaging convex portion, and the other-side gasket body includes an inversely-tapered engaging concave portion embedding therein the engaging convex portion and the deformation portion. At least one of the one-side gasket body and the other-side gasket body includes a flat surface-shaped seal surface, and the reinforc- (Continued)

ing body has a convex shape as the three-dimensional shape protruding toward the flat surface-shaped seal surface.

6 Claims, 11 Drawing Sheets

(51) Int. Cl.
  *B29C 45/14* (2006.01)
  *B29C 45/26* (2006.01)
  *H01M 8/0276* (2016.01)
  *B29C 45/16* (2006.01)
  *H01M 8/0271* (2016.01)
  *B29L 31/26* (2006.01)

(52) U.S. Cl.
  CPC ...... *B29C 45/1615* (2013.01); *B29C 45/1671* (2013.01); *B29C 45/26* (2013.01); *F16J 15/10* (2013.01); *F16J 15/108* (2013.01); *H01M 8/0271* (2013.01); *H01M 8/0278* (2013.01); *B29K 2905/00* (2013.01); *B29L 2031/265* (2013.01); *Y02P 70/50* (2015.11)

(58) Field of Classification Search
  CPC ........... B29C 45/1615; B29C 45/1671; B29C 45/26; H01M 8/0271; H01M 8/0278; Y02P 70/40; B29K 2905/00; B29L 2031/265

See application file for complete search history.

(56) References Cited

U.S. PATENT DOCUMENTS

| | | | |
|---|---|---|---|
| 5,879,789 A * | 3/1999 | Dolan | B32B 27/28 428/212 |
| 7,832,736 B2 * | 11/2010 | Takahashi | F16J 15/122 277/592 |
| 11,028,924 B2 * | 6/2021 | Yoshida | H01M 8/0286 |
| 2002/0122970 A1 | 9/2002 | Inoue et al. | |
| 2009/0023035 A1 | 1/2009 | Sasaoka | |
| 2012/0018927 A1 | 1/2012 | Watanabe | |
| 2013/0065158 A1 | 3/2013 | Masaka et al. | |
| 2015/0295210 A1 | 10/2015 | Horimoto et al. | |
| 2017/0120488 A1 | 5/2017 | Hayashi | |
| 2018/0163870 A1 | 6/2018 | Saso et al. | |

FOREIGN PATENT DOCUMENTS

| | | |
|---|---|---|
| JP | 2000-230640 A | 8/2000 |
| JP | 2002-237317 A | 8/2002 |
| JP | 2010-182636 A | 8/2010 |
| JP | 2010-234646 A | 10/2010 |
| JP | 2012-021640 A | 2/2012 |
| JP | 2014-092191 A | 5/2014 |
| JP | 2014-203553 A | 10/2014 |
| JP | 2015-106477 A | 6/2015 |
| JP | 2016-016619 A | 2/2016 |
| JP | 2016-095961 A | 5/2016 |
| JP | 2016-223616 A | 12/2016 |
| WO | WO-2016-163158 A1 | 10/2016 |

* cited by examiner

GASKET AND METHOD FOR MANUFACTURING SAME

CROSS REFERENCE TO RELATED APPLICATIONS

This application is a U.S. National Stage application of International Application No. PCT/JP2017/034102 filed on Sep. 21, 2017 and published in Japanese as WO 2018/079143 on May 3, 2018 and claims priority to Japanese Patent Application Nos. 2016-210340 and 2016-210341, both filed on Oct. 27, 2016. The entire disclosures of the above applications are expressly incorporated by reference herein.

BACKGROUND

Technical Field

The present invention relates to a gasket that includes seal parts on both sides of the gasket in a thickness direction and a method for manufacturing the same. For example, the gasket according to the present invention is used as a gasket for a fuel cell or is used as other general gaskets.

Related Art

Conventionally, a rubber-only type gasket 101 as illustrated in FIG. 11 and a separator-integrated gasket 111 in which a gasket body 113 is integrally molded with a separator 112 as illustrated in FIG. 12 have been known as a gasket used for a fuel cell.

However, because the rubber-only type gasket 101 is configured of only rubber material, this gasket is too flexible and thus has trouble in handling such as carrying.

Moreover, the separator-integrated gasket 111 needs to previously apply an adhesive 114 on the separator 112 and then integrally mold the gasket body 113 therewith or to mold the gasket body 113 from a self-adhesive material. Therefore, there is a disadvantage that man-hours increase because an adhesive applying process is performed, and also there is a disadvantage that the option for rubber material is limited to material with self-adhesiveness.

In view of the above points, an object of the present invention is to provide a gasket and a method for manufacturing the same, which can improve handling as compared to the rubber-only type gasket.

SUMMARY OF THE INVENTION

To solve the above problems, a gasket according to the present invention includes a reinforcing body that is made of a resin film, a one-side gasket body that is provided on one surface of the reinforcing body in a thickness direction thereof, and another-side gasket body that is provided on another surface of the reinforcing body in the thickness direction, wherein the reinforcing body has, in a portion sandwiched between both the gasket bodies, a three-dimensional shape in which the resin film is bent in its thickness direction.

Moreover, in the gasket described above, the one-side gasket body includes an inversely-tapered engaging convex portion that protrudes toward the other-side gasket body, the reinforcing body includes a deformation portion as the three-dimensional shape that is deformed along a shape of the engaging convex portion, and the other-side gasket body includes an inversely-tapered engaging concave portion that embeds therein the engaging convex portion and the deformation portion.

Moreover, a method, for manufacturing the gasket described above, includes: sequentially performing a process of molding the one-side gasket body on the one surface of the reinforcing body in the thickness direction by using a first metal mold and a process of molding the other-side gasket body on the other surface of the reinforcing body in the thickness direction by using a second metal mold, wherein the first metal mold includes a first split mold and a second split mold and includes a structure sandwiching the reinforcing body between both the split molds, the first split mold includes a one-side gasket-body molding cavity to mold a portion other than the engaging convex portion within the one-side gasket body, and the second split mold includes an engaging-convex-portion molding cavity to mold the engaging convex portion within the one-side gasket body, the second metal mold includes a first split mold and a second split mold and includes a structure sandwiching the reinforcing body between both the split molds, the first split mold of the second metal mold includes an accommodating space to accommodate the portion other than the engaging convex portion within the one-side gasket body, and the second split mold of the second metal mold includes another-side gasket-body molding cavity to accommodate the engaging convex portion within the one-side gasket body and the deformation portion covering the engaging convex portion and to mold the other-side gasket body in a state where the portions are accommodated, and the deformation portion is formed by deforming the reinforcing body along an inner surface of the engaging-convex-portion molding cavity by using a molding pressure when molding the one-side gasket body by using the first metal mold.

Moreover, in the gasket described above, at least one gasket body of the one-side gasket body and the other-side gasket body includes a flat surface-shaped seal surface, and the reinforcing body has a convex shape as the three-dimensional shape that protrudes toward the flat surface-shaped seal surface.

Moreover, in the gasket described above, the reinforcing body has a bellows shape, and one of a peak and a valley in the bellows shape is defined as the convex shape.

Moreover, a method, for manufacturing the gasket described above, includes: sequentially performing a process of molding the one-side gasket body on the one surface of the reinforcing body in the thickness direction by using a first metal mold and a process of molding the other-side gasket body on the other surface of the reinforcing body in the thickness direction by using a second metal mold, wherein the first metal mold includes a first split mold and a second split mold and includes a structure sandwiching the reinforcing body between both the split molds, the first split mold includes a one-side gasket-body molding cavity to mold the one-side gasket body, and the second split mold includes a concave portion to form the convex shape on the reinforcing body, the second metal mold includes a first split mold and a second split mold and includes a structure sandwiching the reinforcing body between both the split molds, the first split mold of the second metal mold includes an accommodating space to accommodate the one-side gasket body, and the second split mold of the second metal mold includes another-side gasket-body molding cavity to accommodate the convex shape and to mold the other-side gasket body in a state where the convex shape is accommodated, and the convex shape is formed by deforming the reinforcing body along an inner surface of the concave portion by using a molding pressure when molding the one-side gasket body by using the first metal mold.

Furthermore, a method, for manufacturing the gasket described above, includes: sequentially performing a process of molding the one-side gasket body on the one surface of the reinforcing body in the thickness direction by using a first metal mold and a process of molding the other-side gasket body on the other surface of the reinforcing body in the thickness direction by using a second metal mold, wherein the first metal mold includes a first split mold and a second split mold and includes a structure sandwiching the reinforcing body between both the split molds, the first split mold includes a one-side gasket-body molding cavity to mold the one-side gasket body, and the second split mold includes an uneven portion to form the bellows shape on the reinforcing body, the second metal mold includes a first split mold and a second split mold and includes a structure sandwiching the reinforcing body between both the split molds, the first split mold of the second metal mold includes an accommodating space to accommodate the one-side gasket body, and the second split mold of the second metal mold includes another-side gasket-body molding cavity to accommodate the bellows shape and to mold the other-side gasket body in a state where the bellows shape is accommodated, and the bellows shape is formed by deforming the reinforcing body along a surface of the uneven portion by using a molding pressure when molding the one-side gasket body by using the first metal mold.

Effect of the Invention

In the present invention that employs the above configuration, because the one-side gasket body and the other-side gasket body are reinforced by the reinforcing body made of resin film, strength or shape retention of the gasket as a whole is raised compared to when there is not the reinforcing body. Therefore, it is possible to improve the handling of the gasket as compared to the rubber-only type gasket.

Moreover, because the reinforcing body has a three-dimensional shape in which a resin film is bent in its thickness direction in a portion sandwiched between both the gasket bodies, the three-dimensional shape can be used for the joining of the components and the surface pressure adjustment of the seal parts.

DETAILED DESCRIPTION OF THE PREFERRED EMBODIMENTS

Next, exemplary embodiments will be explained in accordance with the accompanying drawings.

First Embodiment

Figure 1:
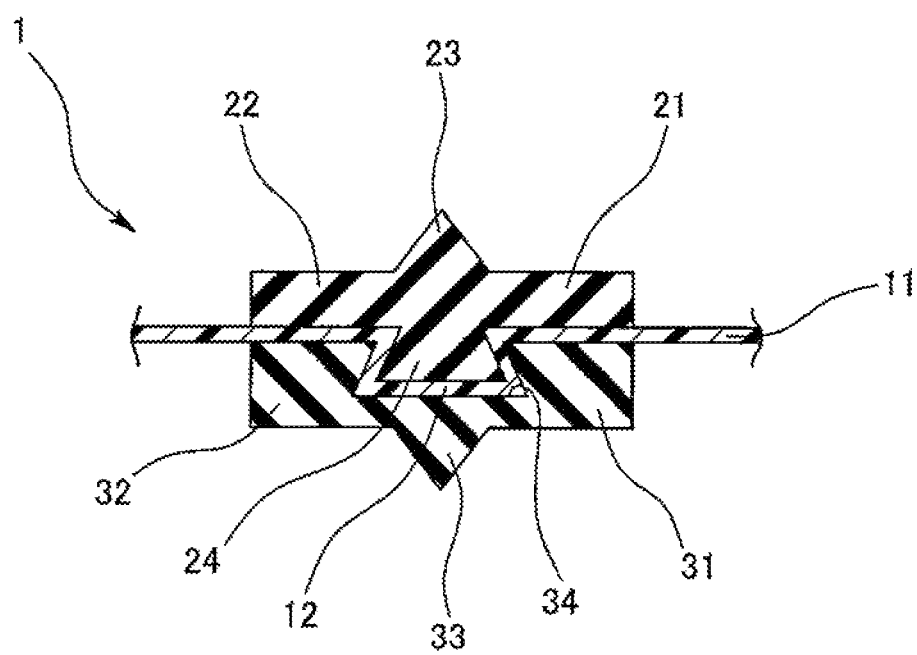
FIG. 1 is a cross-sectional diagram illustrating the main parts of a gasket according to a first embodiment of the present invention.

As illustrated in FIG. 1, a gasket indicated by the reference number 1 as a whole is a double-sided gasket that includes seal parts on both sides in a thickness direction thereof, and is configured by a combination of a reinforcing body 11 made of a resin film having a predetermined thickness, a one-side gasket body 21 provided on one surface (upper surface in the diagram) of the reinforcing body 11 in a thickness direction thereof, and another-side gasket body 31 provided on another surface (lower surface in the diagram) of the reinforcing body 11 in the thickness direction. The one-side gasket body 21 and the other-side gasket body 31 are arranged with their planar positions aligned and their gasket widths are set to be equal or substantially equal. The gasket 1 is used as a gasket for a fuel cell.

The one-side gasket body 21 is molded of a predetermined rubber-like elastic body (may not have self-adhesiveness), and includes a base 22 whose cross section has a rectangular shape. A seal lip 23 is integrally provided on the upper surface of the base 22 and an inversely-tapered engaging convex portion 24 is integrally provided on the lower surface of the base 22 while protruding toward the other-side gasket body 31. Herein, the inversely-tapered shape means that an angle between the lower surface of the base 22 and the side surface of the engaging convex portion 24 is set to be smaller than a right angle, and both side surfaces of the engaging convex portion 24 are inversely tapered. Therefore, the cross section of the engaging convex portion 24 has a trapezoidal or substantially trapezoidal shape.

The reinforcing body 11 made of a resin film is planar. A zone in which the reinforcing body overlaps with the engaging convex portion 24 is deformed along the cross-sectional shape of the engaging convex portion 24, and consequently the reinforcing body includes a deformation portion 12 (also referred to as covering portion or convex shape) as a three-dimensional shape that covers the engaging convex portion 24. Because the thickness of the resin film is substantially constant, the engaging convex portion 24 maintains an inversely-tapered shape even if it is coated by the resin film.

The other-side gasket body 31 is molded of a predetermined rubber-like elastic body (may not have self-adhesiveness), and includes a base 32 whose cross section has a rectangular shape. The other-side gasket body further includes a seal lip 33 that is integrally provided on the lower surface of the base 32 and an inversely-tapered engaging concave portion 34 that is provided on the upper surface of the base 32 to embed therein the engaging convex portion 24 and the deformation portion 12. Herein, the inversely-tapered shape means that an angle between the bottom surface and the side surface among the inner surfaces of the engaging concave portion 34 is set to be smaller than a right angle, and both side surfaces of the engaging concave portion 34 are inversely tapered. Therefore, the cross section of the engaging concave portion 34 has a trapezoidal or substantially trapezoidal shape, and further the engaging concave portion 34 has such a size that the engaging concave portion can engage with the engaging convex portion 24 to thus be retained.

The kind of the resin film for the reinforcing body 11 is not particularly limited if it is a film tolerating a molding temperature, including a general-purpose film such as polypropylene, polyethylene, and polystyrene, engineering plastic such as nylon and polyphenylene sulfide, and the like, as specific examples. It is preferable that the thickness of the film is around 0.1 to 0.3 mm although the thickness depends on the wire diameter and the cross-sectional shape of the gasket. As a specific example, the material of the gasket bodies 21 and 31 can include silicone rubber, fluorine-contained rubber, EPDM, PIB, and the like.

In the gasket 1 that includes the above configuration, because the one-side gasket body 21 and the other-side gasket body 31 made of the rubber-like elastic body are reinforced by the reinforcing body 11 made of the resin film, strength or shape retention of the gasket 1 as a whole is raised compared to when there is not the reinforcing body 11. Therefore, the handling of the gasket 1 can be improved as compared to the conventional rubber-only type gasket.

Moreover, in the gasket 1 having the above configuration, a gasket product is manufactured by combining the one-side gasket body 21, the other-side gasket body 31, and the reinforcing body 11, and this gasket product is assembled to a partner component such as a separator as a single gasket product when assembling a fuel cell stack similarly to the conventional rubber-only type gasket. Therefore, because the gasket is not a gasket that is molded integrally with the separator like the conventional separator-integrated gasket, the gasket does not require adhesive for integral molding and also does not require to be made of a self-adhesive material.

Moreover, in the gasket 1 having the above configuration, by mutually engaging the inversely-tapered engaging convex portion 24 provided in the one-side gasket body 21 with the inversely-tapered engaging concave portion 34 provided in the other-side gasket body 31 in the state where the deformation portion 12 of the reinforcing body 11 is sandwiched therebetween, the one-side gasket body 21, the other-side gasket body 31, and the reinforcing body 11 are integrated with each other. Thus, this unification also does not require adhesive and the gasket does not require to be made of a self-adhesive material. Therefore, the one-side gasket body 21 and the other-side gasket body 31 can be fixed to the reinforcing body 11 even if neither the adhesive nor the self-adhesive material is used, and the gasket 1 can be manufactured by the combination of the one-side gasket body 21, the other-side gasket body 31, and the reinforcing body 11. The cross-sectional shape of the one-side gasket body 21 and the other-side gasket body 31 is not particularly limited. For example, the seal lips 23 and 33 may not be provided.

Next, a method for manufacturing the gasket 1 having the above configuration will be explained.

The manufacturing is performed by an injection molding method. The injection molding method uses two sets of metal molds consisting of a first metal mold and a second metal mold. First, by using the first metal mold, the method performs a process (first molding process) for molding the one-side gasket body 21 on one surface of the reinforcing body 11 in the thickness direction. Next, by using the second metal mold, the method performs a process (second molding process) for molding the other-side gasket body 31 on the other surface of the reinforcing body 11 in the thickness direction.

First Molding Process

Figure 2A:
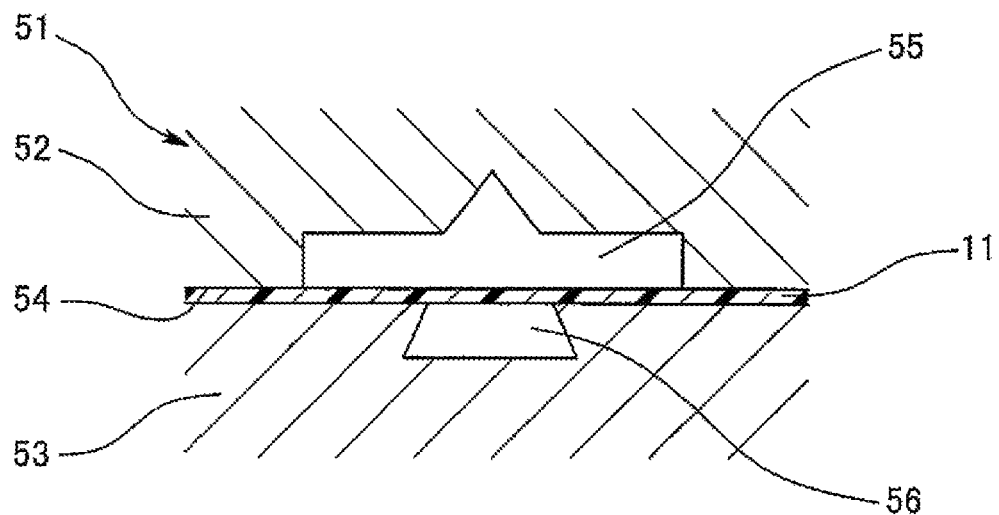
FIGS. 2A and 2B are diagrams explaining a manufacturing process of the gasket.

As illustrated in FIG. 2A, a first metal mold 51 is configured by the combination of a first split mold (upper mold) 52 and a second split mold (lower mold) 53, and a sandwiching structure (sandwiching space) 54 to sandwich the reinforcing body 11 is provided in the parting portion between both the split molds 52 and 53. A one-side gasket-body molding cavity 55 to mold a portion (the base 22 and the seal lip 23) other than the engaging convex portion 24 within the one-side gasket body 21 is provided on the parting surface of the first split mold 52. An engaging-convex-portion molding cavity 56 to mold the engaging convex portion 24 within the one-side gasket body 21 is provided on the parting surface of the second split mold 53. The latter engaging-convex-portion molding cavity 56 also forms an inversely-tapered shape to provide the shape of a reverse taper to the engaging convex portion 24.

Figure 2B:
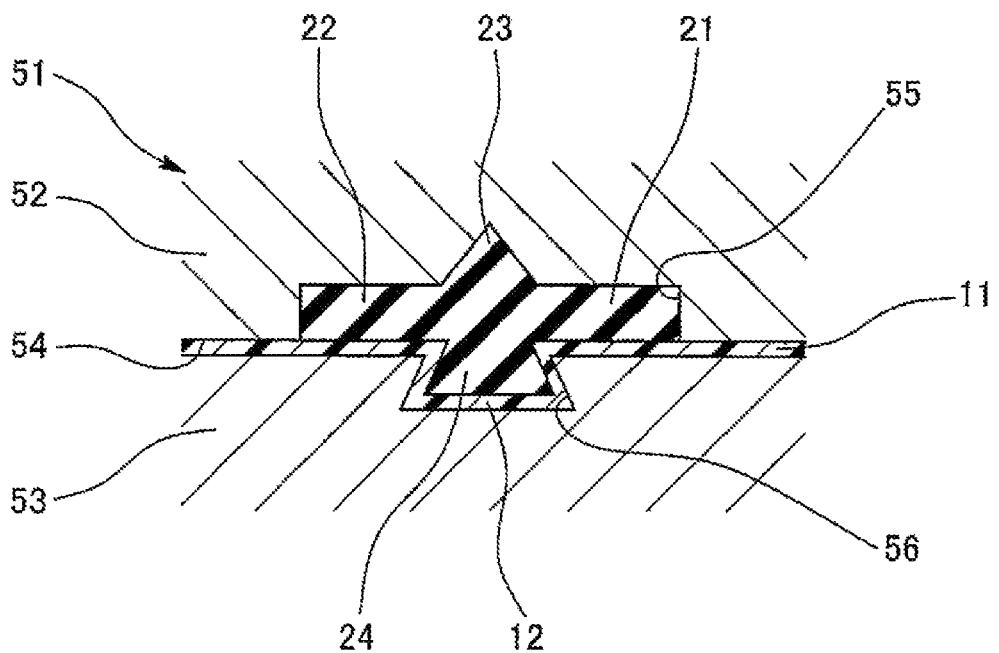

As the procedure of the process, mold clamping is performed on the planar reinforcing body 11 in the state where the reinforcing body is sandwiched between both the split molds 52 and 53 as illustrated in FIG. 2A, and then a molding material is filled up into the cavities 55 from a gate not illustrated to mold the one-side gasket body 21 as illustrated in FIG. 2B. At this time, the portion of the reinforcing body 11 is deformed along the inner surface of the engaging-convex-portion molding cavity 56 due to its molding pressure (injection pressure), and thus the molding material is filled up into not only the one-side gasket-body molding cavity 55 but also the engaging-convex-portion molding cavity 56. As a result, the engaging convex portion 24 is molded in the one-side gasket body 21 and the deformation portion 12 is formed in the reinforcing body 11.

Moreover, the adhesive is not used in this molding, but when the one-side gasket body 21 has an adherence property on its material, the one-side gasket body 21 is regarded to adhere to the reinforcing body 11 due to the adherence property.

Figure 3:
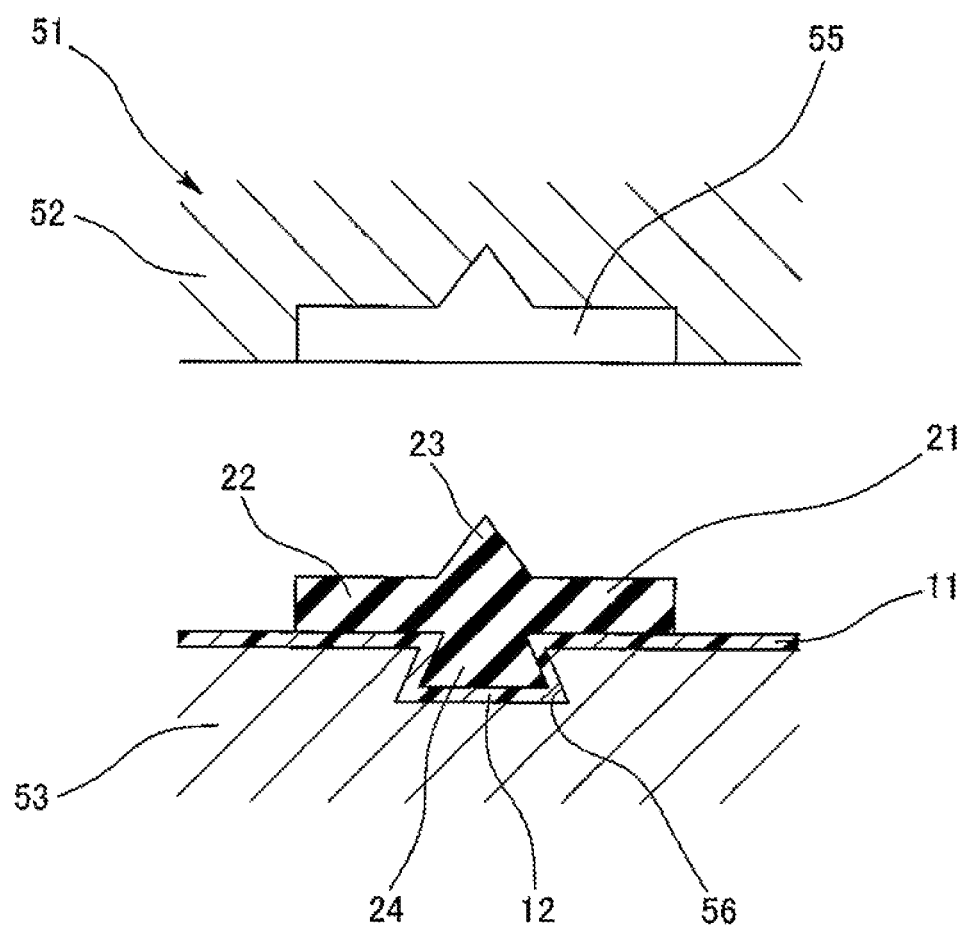
FIG. 3 is a diagram explaining the manufacturing process of the gasket.

Next, as illustrated in FIG. 3, mold opening is performed to detach (release) a molding product (the one-side gasket body 21 and the reinforcing body 11) attached to the second split mold 53 from the second split mold 53.

When this mold opening is performed, it is concerned that the one-side gasket body 21 and the reinforcing body 11 are separated from each other by causing the one-side gasket body 21 to adhere to the first metal mold 51 and the reinforcing body 11 to be left on the second split mold 53. As described above, in the embodiment of the present invention, because the inversely-tapered engaging convex portion 24 engages with the engaging-convex-portion molding cavity 56 having the same inversely-tapered shape so as to be retained, the one-side gasket body 21 and the reinforcing body 11 are not separated. Therefore, the subsequent process is smoothly continued. The angle of the reverse taper is sufficient if it is not less than 0.1°.

Second Molding Process

Figure 4A:
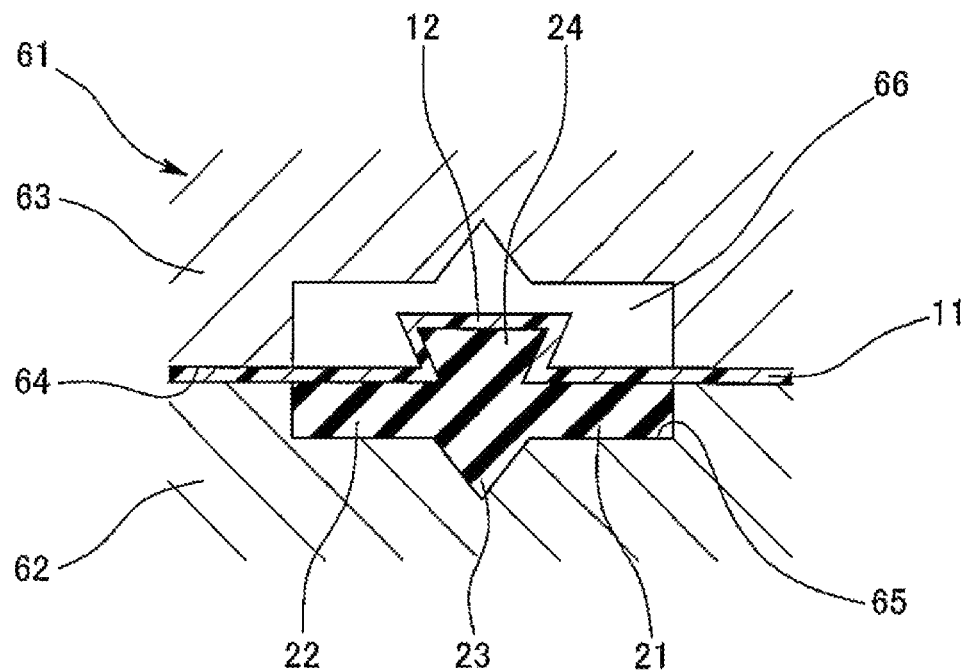
FIGS. 4A and 4B are diagrams explaining the manufacturing process of the gasket.

As illustrated in FIG. 4A, a second metal mold 61 is configured by a combination of a first split mold (lower mold) 62 and a second split mold (upper mold) 63, and a sandwiching structure 64 to sandwich the reinforcing body 11 is provided in the parting portion between both the split molds 62 and 63. An accommodating space 65 to accommodate a portion (the base 22 and the seal lip 23) other than the engaging convex portion 24 within the one-side gasket body 21 that is already molded in the first molding process is provided on the parting surface of the first split mold 62. Another-side gasket-body molding cavity 66 to accommodate the engaging convex portion 24 within the one-side gasket body 21 and the deformation portion 12 covering the engaging convex portion 24 and to mold the other-side gasket body 31 in the state where these are accommodated is provided on the parting surface of the second split mold 63.

Figure 4B:
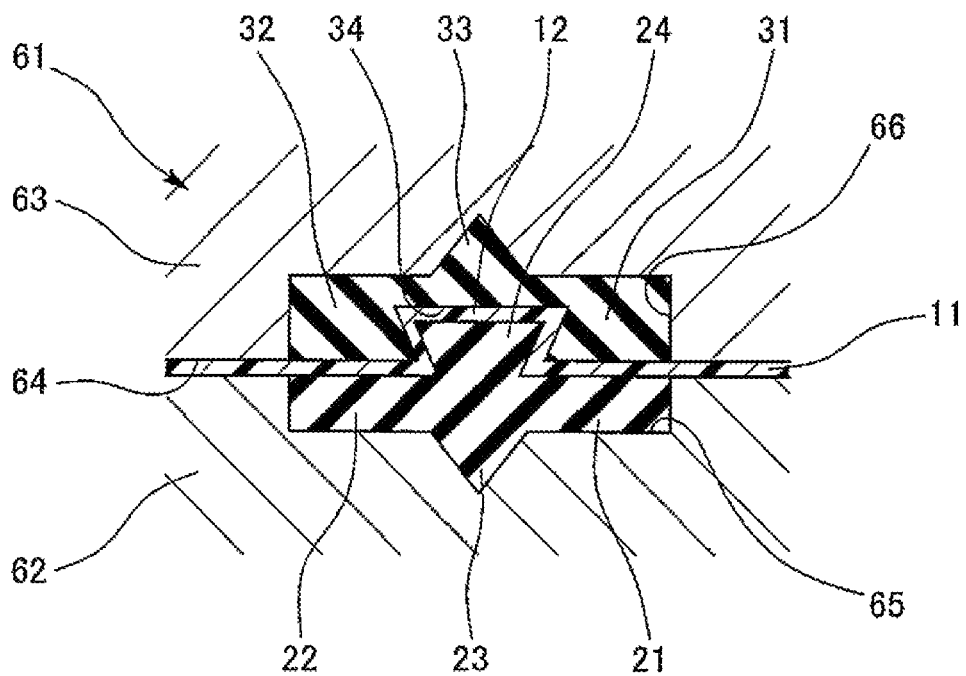

As the procedure of the process, mold clamping is performed in the state where the reinforcing body 11 is sandwiched between both the split molds 62 and 63 and a portion other than the engaging convex portion 24 within the one-side gasket body 21 is accommodated in the accommodating space 65 as illustrated in FIG. 4A, and a molding material is filled up into the other-side gasket-body molding cavity 66 from a gate not illustrated to mold the other-side gasket body 31 as illustrated in FIG. 4B. At this time, because the engaging convex portion 24 within the one-side gasket body 21 and the deformation portion 12 covering the engaging convex portion 24 are accommodated in the other-side gasket-body molding cavity 66, the engaging concave portion 34 is molded in the other-side gasket body 31 simultaneously with molding the other-side gasket body 31.

Moreover, the adhesive is not used even in this molding, but when the other-side gasket body 31 has an adherence property on its material, the other-side gasket body 31 is regarded to adhere to the reinforcing body 11 due to this adherence property.

Next, mold opening is performed to detach (release) the gasket 1 formed by the combination of the reinforcing body 11, the one-side gasket body 21, and the other-side gasket body 31 from the second metal mold 61.

The molded gasket 1 is regarded as an integrated product that does not use adhesive by causing the inversely-tapered engaging convex portion 24 provided in the one-side gasket body 21 and the inversely-tapered engaging concave portion 34 provided in the other-side gasket body 31 to engage with each other in the state where the deformation portion 12 of the reinforcing body 11 is sandwiched therebetween.

Second Embodiment

Figure 5:
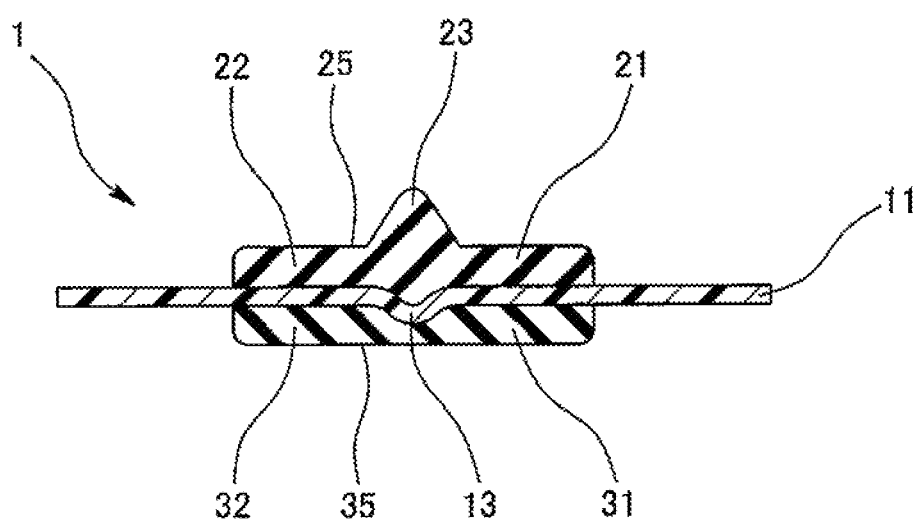
FIG. 5 is a cross-sectional diagram illustrating the main parts of a gasket according to a second embodiment of the present invention.

As illustrated in FIG. 5, a gasket indicated by the reference number 1 as a whole is a double-sided gasket that includes seal parts on both sides in a thickness direction thereof, and is configured by a combination of: the reinforcing body 11 made of a resin film having a predetermined thickness; the one-side gasket body 21 provided on one surface (upper surface in the diagram) of the reinforcing body 11 in the thickness direction; and the other-side gasket body 31 provided on another surface (lower surface in the diagram) of the reinforcing body 11 in the thickness direction. The one-side gasket body 21 and the other-side gasket body 31 are arranged with their planar positions aligned and their gasket widths are set to be equal or substantially equal. The gasket 1 is used as a gasket for a fuel cell.

The one-side gasket body 21 is molded of a predetermined rubber-like elastic body (may not have self-adhesiveness), and includes the base 22 whose cross section has a rectangular shape. A seal surface 25 having the seal lip 23 is provided on the upper surface of the base 22.

The other-side gasket body 31 is molded of a predetermined rubber-like elastic body (may not have self-adhesiveness), and includes the base 32 whose cross section has a rectangular shape. A flat surface-shaped seal surface 35 that does not have a seal lip is provided on the lower surface of the base 32.

The reinforcing body 11 made of the resin film is planar. A sectional arc-like convex shape 13 as a three-dimensional shape that protrudes toward the flat surface-shaped seal surface 35 of the other-side gasket body 31 is provided in a portion of a region sandwiched by both the gasket bodies 21 and 31. Only the portion has a three-dimensional shape.

The kind of the resin film for the reinforcing body 11 is not particularly limited if it is a film tolerating a molding temperature, but can include a general-purpose film such as polypropylene, polyethylene, and polystyrene, engineering plastic such as nylon and polyphenylene sulfide, and the like, as specific examples. It is preferable that the thickness of the film is around 0.1 to 0.3 mm although the thickness depends on the wire diameter and the cross-sectional shape of the gasket. As a specific example, the material of the gasket bodies 21 and 31 can include silicone rubber, fluorine-contained rubber, EPDM, PIB, and the like.

In the gasket 1 that includes the above configuration, because the one-side gasket body 21 and the other-side gasket body 31 made of the rubber-like elastic body are reinforced by the reinforcing body 11 made of the resin film, strength or shape retention of the gasket 1 as a whole is raised compared to when there is not the reinforcing body 11. Therefore, the handling of the gasket 1 can be improved as compared to the conventional rubber-only type gasket.

Moreover, in the gasket 1 having the above configuration, a gasket product is manufactured by combining the one-side gasket body 21, the other-side gasket body 31, and the reinforcing body 11, and this gasket product is assembled to a partner component such as a separator as a single gasket product when assembling a fuel cell stack similarly to the conventional rubber-only type gasket. Therefore, because the gasket is not a gasket that is molded integrally with the separator like the conventional separator-integrated gasket, the gasket does not require adhesive for integral molding and also the gasket does not require to be made of a self-adhesive material.

Moreover, in the gasket 1 having the above configuration, because the reinforcing body 11 made of the resin film has the convex shape 13 that protrudes toward the flat surface-shaped seal surface 35 of the other-side gasket body 31, a seal surface pressure rises on the flat surface-shaped seal surface 35 and the peak value of the seal surface pressure rises by using the convex shape 13 as a backup part. Therefore, the seal surface pressure on the flat surface-shaped seal surface 35 can be increased to improve sealability compared to when there is not the convex shape.

Next, a method for manufacturing the gasket 1 having the above configuration will be explained.

The manufacturing is performed by an injection molding method. The injection molding method uses two sets of metal molds consisting of a first metal mold and a second metal mold. First, the method performs a process (first molding process) for molding the one-side gasket body 21 on one surface of the reinforcing body 11 in the thickness direction by using the first metal mold. Next, the method performs a process (second molding process) for molding the other-side gasket body 31 on the other surface of the reinforcing body 11 in the thickness direction by using the second metal mold.

First Molding Process

Figure 6A:
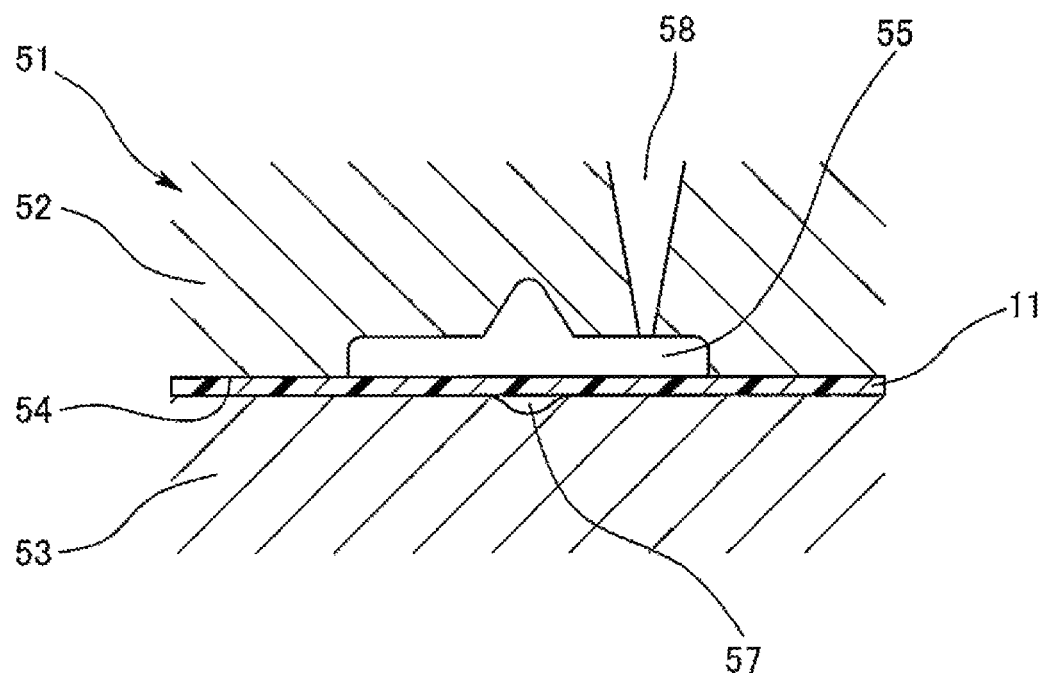
FIGS. 6A and 6B are diagrams explaining a manufacturing process of the gasket.

As illustrated in FIG. 6A, the first metal mold 51 is configured by a combination of the first split mold (upper mold) 52 and the second split mold (lower mold) 53, and the sandwiching structure (sandwiching space) 54 to sandwich the reinforcing body 11 is provided in the parting portion between both the split molds 52 and 53. The one-side gasket-body molding cavity 55 to mold the one-side gasket body 21 is provided on the parting surface of the first split mold 52, and a concave portion 57 to form the convex shape 13 of the reinforcing body 11 is provided on the parting surface of the second split mold 53.

Figure 6B:
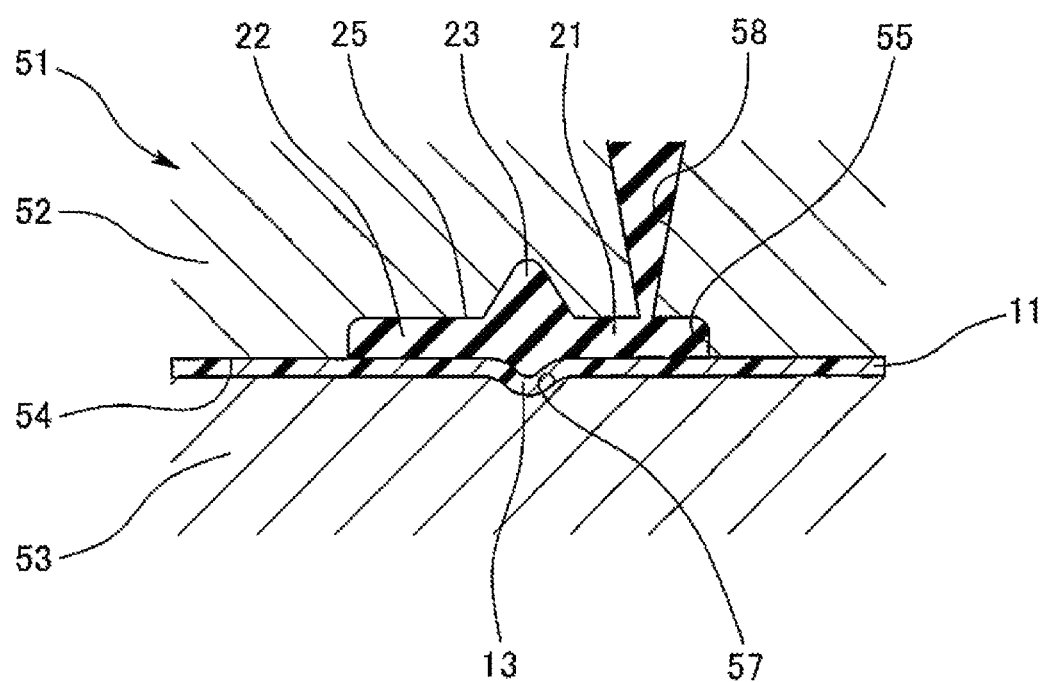

As the procedure of the process, mold clamping is performed in the state where the planar reinforcing body 11 is sandwiched between both the split molds 52 and 53 as illustrated in FIG. 6A, and a molding material is filled up into the cavity 55 from a gate 58 to mold the one-side gasket body 21 as illustrated in FIG. 6B. At this time, the portion of the reinforcing body 11 is deformed along the inner surface of the concave portion 57 due to its molding pressure (injection pressure) to form the convex shape 13.

Moreover, because the adhesive is not used in this molding and the one-side gasket body 21 has an adherence property on its material, the one-side gasket body 21 is regarded to adhere to the reinforcing body 11 due to the adherence property.

Next, mold opening is performed to detach (release) a molding product (the one-side gasket body 21 and the reinforcing body 11) attached to the second split mold 53 from the second split mold 53.

Second Molding Process

Figure 7A:
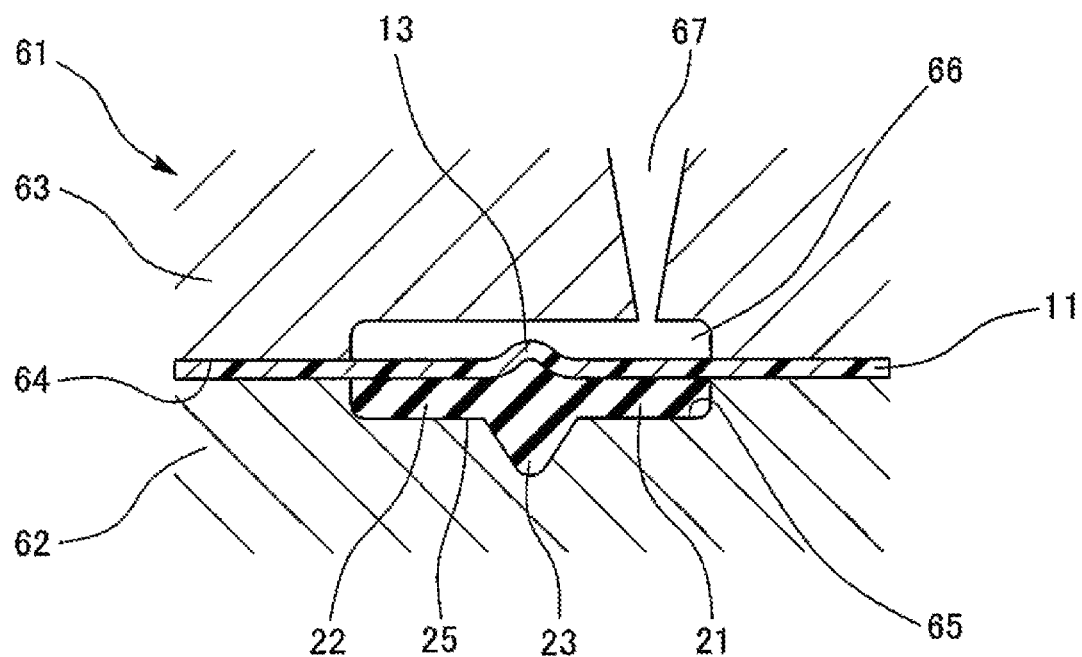
FIGS. 7A and 7B are diagrams explaining the manufacturing process of the gasket.

As illustrated in FIG. 7A, the second metal mold 61 is configured by a combination of the first split mold (lower mold) 62 and the second split mold (upper mold) 63, and the sandwiching structure 64 to sandwich the reinforcing body 11 is provided in the parting portion between both the split molds 62 and 63. The accommodating space 65 to accommodate the one-side gasket body 21 that is already molded in the first molding process is provided on the parting surface of the first split mold 62, and the other-side gasket-body molding cavity 66 to accommodate the convex shape 13 of the reinforcing body 11 and to mold the other-side gasket body 31 in the state where the convex shape is accommodated is provided on the parting surface of the second split mold 63.

Figure 7B:
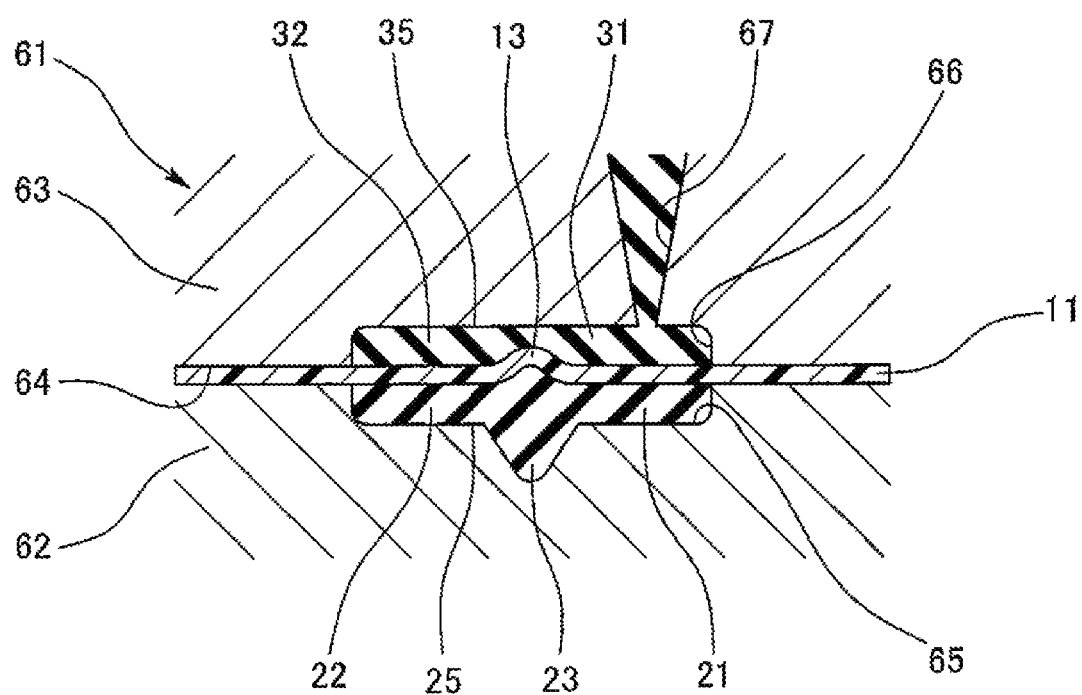

As the procedure of the process, mold clamping is performed in the state where the reinforcing body 11 is sandwiched between both the split molds 62 and 63 and the one-side gasket body 21 is accommodated in the accommodating space 65 as illustrated in FIG. 7A, and a molding material is filled up into the other-side gasket-body molding cavity 66 from a gate 67 to mold the other-side gasket body 31 as illustrated in FIG. 7B. At this time, because the convex shape 13 of the reinforcing body 11 is accommodated in the other-side gasket-body molding cavity 66, the convex shape 13 is embedded by the other-side gasket body 31 simultaneously with molding the other-side gasket body 31.

Moreover, because the adhesive is not used even in this molding and the other-side gasket body 31 has an adherence property on its material, the other-side gasket body 31 is regarded to adhere to the reinforcing body 11 due to the adherence property.

Next, mold opening is performed to detach (release) the gasket 1 formed by the combination of the reinforcing body 11, the one-side gasket body 21, and the other-side gasket body 31 from the second metal mold 61.

Because the one-side gasket body 21 and the other-side gasket body 31 adhere to the reinforcing body 11, the molded gasket 1 is regarded as an integrated product that is molded without using adhesive. Moreover, any of the one-side gasket body 21 and the other-side gasket body 31 may adhere to the reinforcing body 11 by using the adhesive if needed.

Third Embodiment

Figure 8:
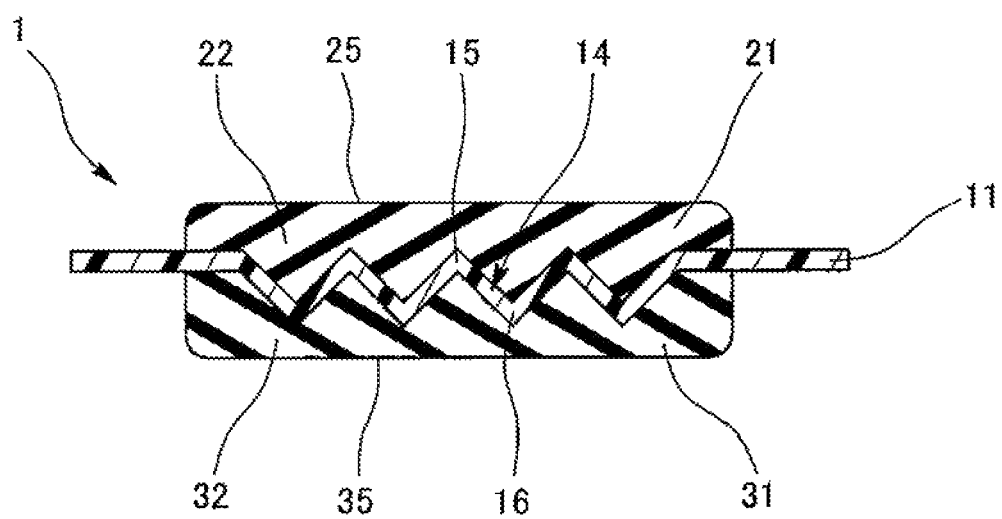
FIG. 8 is a cross-sectional diagram illustrating the main parts of a gasket according to a third embodiment of the present invention.

As illustrated in FIG. 8, a double-sided gasket indicated by the reference number 1 as a whole is configured by a combination of: the reinforcing body 11 made of a resin film having a predetermined thickness; the one-side gasket body 21 provided on one surface (upper surface in the diagram) of the reinforcing body 11 in a thickness direction thereof; and the other-side gasket body 31 provided on another surface (lower surface in the diagram) of the reinforcing body 11 in the thickness direction. The one-side gasket body 21 and the other-side gasket body 31 are arranged with their planar positions aligned and their gasket widths are set to be equal or substantially equal. The gasket 1 is used as a gasket for a fuel cell.

The one-side gasket body 21 is molded of a predetermined rubber-like elastic body (may not have self-adhesiveness), and includes the base 22 whose cross section has a rectangular shape. The flat surface-shaped seal surface 25 that does not have a seal lip is provided on the upper surface of the base 22.

The other-side gasket body 31 is molded of a predetermined rubber-like elastic body (may not have self-adhesiveness), and includes the base 32 whose cross section has a rectangular shape. The flat surface-shaped seal surface 35 that does not have a seal lip is provided on the lower surface of the base 32.

The reinforcing body 11 made of the resin film is planar. A bellows shape 14 as a three-dimensional shape is provided in a portion of a region sandwiched by both the gasket bodies 21 and 31 so that only the portion has a three-dimensional shape. Herein, peaks 15 within the bellows shape 14 have a convex shape protruding toward the flat surface-shaped seal surface 25 provided in the one-side gasket body 21, and valleys 16 within the bellows shape 14 have a convex shape protruding toward the flat surface-shaped seal surface 35 provided in the other-side gasket body 31. The number of each of the peaks 15 and the valleys 16 is two or more (in the diagram, the peaks 15 are provided at three places and the valleys 16 are provided at four places).

The kind of the resin film for the reinforcing body 11 is not particularly limited if it is a film tolerating a molding temperature, including a general-purpose film such as polypropylene, polyethylene, and polystyrene, engineering plastic such as nylon and polyphenylene sulfide, and the like, as specific examples. It is preferable that the thickness of the film is around 0.1 to 0.3 mm although the thickness depends on the wire diameter and the cross-sectional shape of the gasket. As a specific example, the material of the gasket bodies 21 and 31 can include silicone rubber, fluorine-contained rubber, EPDM, PIB, and the like.

In the gasket 1 that includes the above configuration, because the one-side gasket body 21 and the other-side gasket body 31 made of the rubber-like elastic body are reinforced by the reinforcing body 11 made of the resin film, strength or shape retention of the gasket 1 as a whole is raised compared to when there is not the reinforcing body 11. Therefore, the handling of the gasket 1 can be improved as compared to the conventional rubber-only type gasket.

Moreover, in the gasket 1 having the above configuration, a gasket product is manufactured by combining the one-side gasket body 21, the other-side gasket body 31, and the reinforcing body 11, and this gasket product is assembled to a partner component such as a separator as a single gasket product when assembling a fuel cell stack similarly to the conventional rubber-only type gasket. Therefore, because the gasket is not a gasket that is molded integrally with the separator like the conventional separator-integrated gasket, the gasket does not require adhesive for integral molding and also the gasket does not require to be made of a self-adhesiveness material.

Moreover, in the gasket 1 having the above configuration, the bellows shape 14 is provided in the reinforcing body 11 made of the resin film. Herein, the peaks 15 within the bellows shape 14 have a convex shape protruding toward the flat surface-shaped seal surface 25 provided in the one-side gasket body 21 and the valleys 16 within the bellows shape 14 have a convex shape protruding toward the flat surface-shaped seal surface 35 provided in the other-side gasket body 31. Thus, seal surface pressures respectively rise on the flat surface-shaped seal surfaces 25 and 35 and the peak values of the seal surface pressures rise by using these convex shapes as a backup part. Therefore, the seal surface pressures on the flat surface-shaped seal surfaces 25 and 35 can be increased to improve sealability compared to when there is not the convex shape.

Next, a method for manufacturing the gasket 1 having the above configuration will be explained.

The manufacturing is performed by an injection molding method. The injection molding method uses two sets of metal molds made of a first metal mold and a second metal mold. First, the method performs a process (first molding process) for molding the one-side gasket body 21 on one surface of the reinforcing body 11 in the thickness direction by using the first metal mold. Next, the method performs a process (second molding process) for molding the other-side gasket body 31 on the other surface of the reinforcing body 11 in the thickness direction by using the second metal mold.

First Molding Process

Figure 9A:
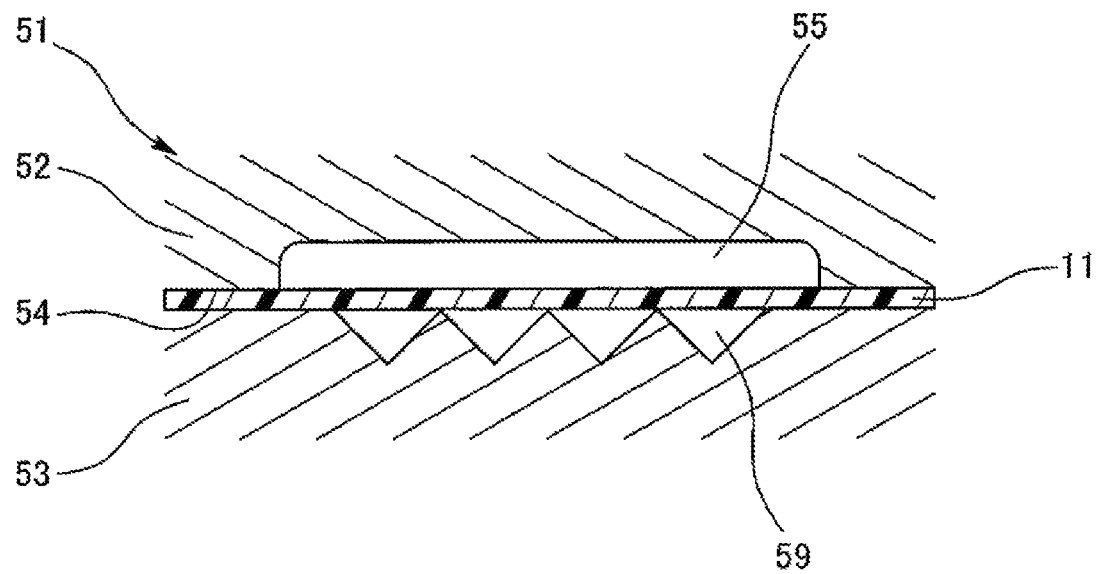
FIGS. 9A and 9B are diagrams explaining a manufacturing process of the gasket.

As illustrated in FIG. 9A, the first metal mold 51 is configured by a combination of the first split mold (upper mold) 52 and the second split mold (lower mold) 53, and the sandwiching structure (sandwiching space) 54 to sandwich the reinforcing body 11 is provided in the parting portion between both the split molds 52 and 53. The one-side gasket-body molding cavity 55 to mold the one-side gasket body 21 is provided on the parting surface of the first split mold 52, and an uneven portion 59 to form the bellows shape 14 of the reinforcing body 11 is provided on the parting surface of the second split mold 53.

Figure 9B:
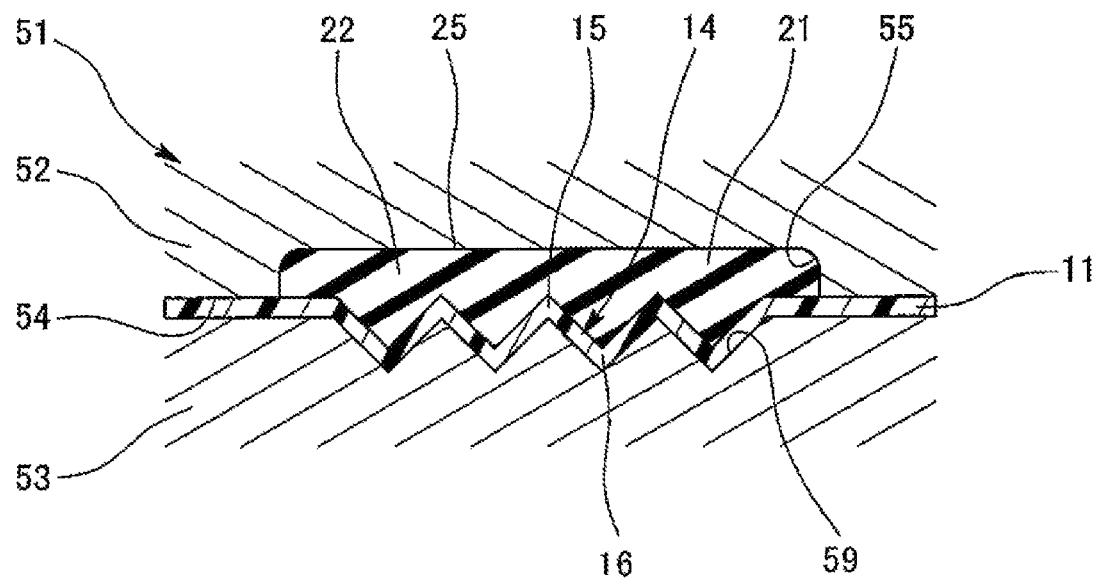

As the procedure of the process, mold clamping is performed in the state where the planar reinforcing body 11 is sandwiched between both the split molds 52 and 53 as illustrated in FIG. 9A, and a molding material is fill up into the cavity 55 from a gate not illustrated to mold the one-side gasket body 21 as illustrated in FIG. 9B. At this time, the portion of the reinforcing body 11 is deformed along the surface of the uneven portion 59 to form the bellows shape 14 due to its molding pressure (injection pressure).

Moreover, because the adhesive is not used in this molding and the one-side gasket body 21 has an adherence property on its material, the one-side gasket body 21 is regarded to adhere to the reinforcing body 11 due to this adherence property.

Next, mold opening is performed to detach (release) a molding product (the one-side gasket body 21 and the reinforcing body 11) attached to the second split mold 53 from the second split mold 53.

Second Molding Process

Figure 10A:
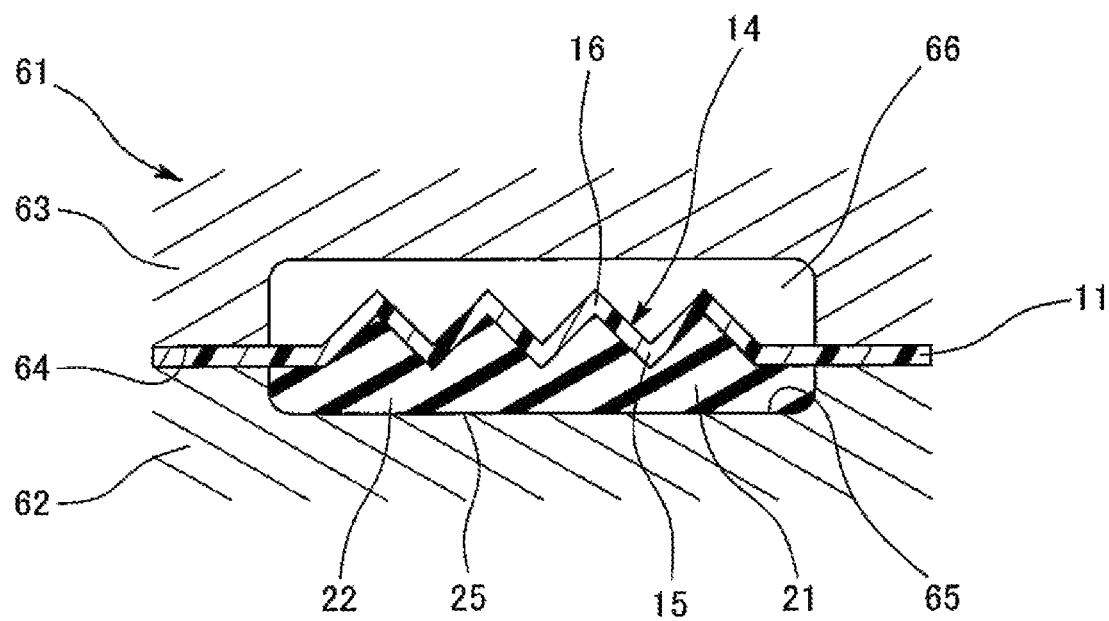
FIGS. 10A and 10B are diagrams explaining the manufacturing process of the gasket.

As illustrated in FIG. 10A, the second metal mold 61 is configured by a combination of the first split mold (lower mold) 62 and the second split mold (upper mold) 63, and the sandwiching structure 64 to sandwich the reinforcing body 11 is provided in the parting portion between both the split molds 62 and 63. The accommodating space 65 to accommodate the one-side gasket body 21 that is already molded in the first molding process is provided on the parting surface of the first split mold 62. The other-side gasket-body molding cavity 66 to accommodate the bellows shape 14 of the reinforcing body 11 and to mold the other-side gasket body 31 in the state where the bellows shape is accommodated is provided on the parting surface of the second split mold 63.

Figure 10B:
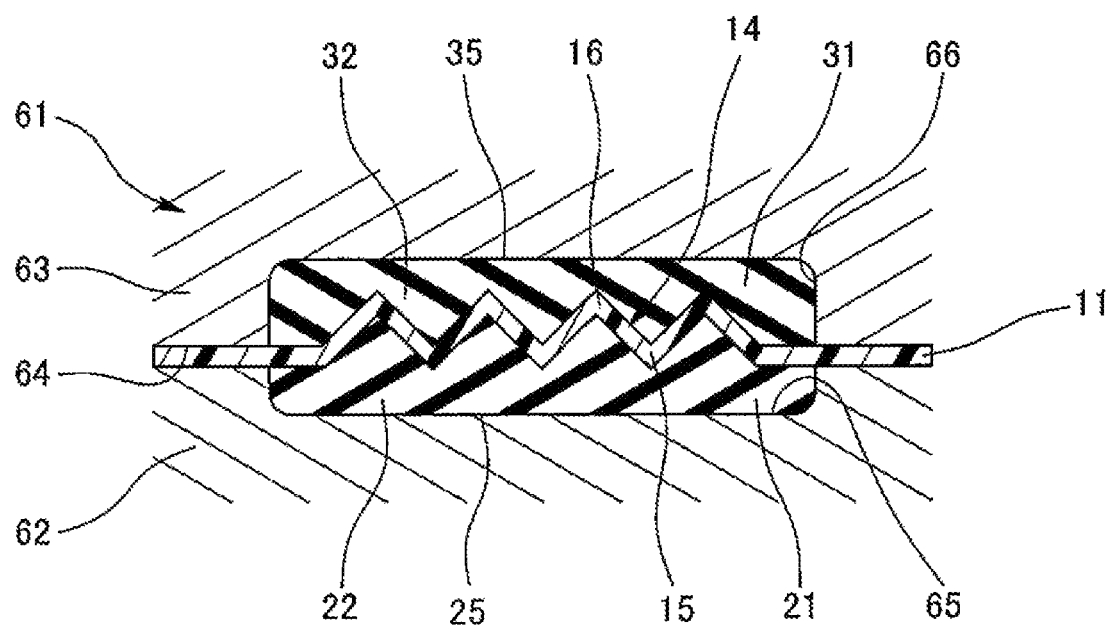
Figure 11:
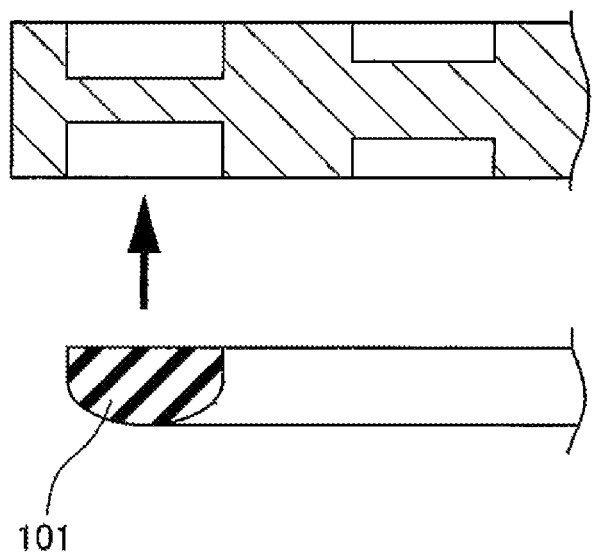
FIG. 11 is a cross-sectional diagram illustrating the main parts of a gasket according to a conventional example.
Figure 12:
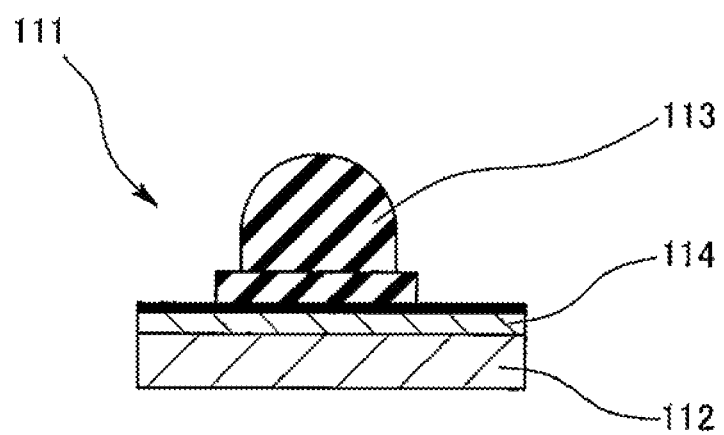
FIG. 12 is a cross-sectional diagram illustrating the main parts of a gasket according to another conventional example.

As the procedure of the process, mold clamping is performed in the state where the reinforcing body 11 is sandwiched between both the split molds 62 and 63 and the one-side gasket body 21 is accommodated in the accommodating space 65 as illustrated in FIG. 10A, and a molding material is filled up into the other-side gasket-body molding cavity 66 from a gate not illustrated to mold the other-side gasket body 31 as illustrated in FIG. 10B. At this time, because the bellows shape 14 of the reinforcing body 11 is accommodated in the other-side gasket-body molding cavity 66, the bellows shape 14 is embedded by the other-side gasket body 31 simultaneously with molding the other-side gasket body 31.

Moreover, because the adhesive is not used even in this molding and the other-side gasket body 31 has an adherence property on its material, the other-side gasket body 31 is regarded to adhere to the reinforcing body 11 due to this adherence property.

Next, mold opening is performed to detach (release) the gasket 1 formed by the combination of the reinforcing body 11, the one-side gasket body 21, and the other-side gasket body 31 from the second metal mold 61.

Because the one-side gasket body 21 and the other-side gasket body 31 adhere to the reinforcing body 11, the molded gasket 1 is regarded as an integrated product that is molded without using adhesive. Moreover, any of the one-side gasket body 21 and the other-side gasket body 31 may adhere to the reinforcing body 11 by using the adhesive if needed. Moreover, insert molding may be performed by preparing and using the reinforcing body 11 in which the bellows shape 14 is previously formed.

The invention claimed is:

1. A gasket comprising:
   a reinforcing body that is made of a resin film;
   a one-side gasket body that is provided on one surface of the reinforcing body in a thickness direction thereof; and
   another-side gasket body that is provided on another surface of the reinforcing body in the thickness direction, wherein
   the reinforcing body has, in a portion sandwiched between both the gasket bodies, a three-dimensional shape in which the resin film is bent in its thickness direction,
   the one-side gasket body includes an inversely-tapered engaging convex portion that protrudes toward the other-side gasket body,
   the reinforcing body includes a deformation portion as the three-dimensional shape that is deformed along a shape of the engaging convex portion, and the other-side gasket body includes an inversely-tapered engaging concave portion that embeds therein the engaging convex portion and the deformation portion.

2. A method for manufacturing the gasket according to claim 1, the method comprising:

sequentially performing a process of molding the one-side gasket body on the one surface of the reinforcing body in the thickness direction by using a first metal mold and a process of molding the other-side gasket body on the other surface of the reinforcing body in the thickness direction by using a second metal mold, wherein the first metal mold includes a first split mold and a second split mold and includes a structure sandwiching the reinforcing body between both the split molds, the first split mold includes a one-side gasket-body molding cavity to mold a portion other than the engaging convex portion within the one-side gasket body, and the second split mold includes an engaging-convex-portion molding cavity to mold the engaging convex portion within the one-side gasket body, the second metal mold includes a first split mold and a second split mold and includes a structure sandwiching the reinforcing body between both the split molds, the first split mold of the second metal mold includes an accommodating space to accommodate the portion other than the engaging convex portion within the one-side gasket body, and the second split mold of the second metal mold includes another-side gasket-body molding cavity to accommodate the engaging convex portion within the one-side gasket body and the deformation portion covering the engaging convex portion and to mold the other-side gasket body in a state where the portions are accommodated, and the deformation portion is formed by deforming the reinforcing body along an inner surface of the engaging-convex-portion molding cavity by using a molding pressure when molding the one-side gasket body by using the first metal mold.

3. A gasket comprising:

a reinforcing body that is made of a resin film;

a one-side gasket body that is provided on one surface of the reinforcing body in a thickness direction thereof; and another-side gasket body that is provided on another surface of the reinforcing body in the thickness direction, wherein the reinforcing body has, in a portion sandwiched between both the gasket bodies, a three-dimensional shape in which the resin film is bent in its thickness direction, at least one gasket body of the one-side gasket body and the other-side gasket body includes a flat surface-shaped seal surface, and the reinforcing body has a convex shape as the three-dimensional shape that protrudes toward the flat surface-shaped seal surface.

4. A gasket comprising:

a reinforcing body that is made of a resin film;

a one-side gasket body that is provided on one surface of the reinforcing body in a thickness direction thereof; and another-side gasket body that is provided on another surface of the reinforcing body in the thickness direction, wherein the reinforcing body has, in a portion sandwiched between both the gasket bodies, a three-dimensional shape in which the resin film is bent in its thickness direction, the reinforcing body has a bellows shape, and one of a peak and a valley in the bellows shape is defined as the convex shape.

5. A method for manufacturing the gasket according to claim 3, the method comprising:

sequentially performing a process of molding the one-side gasket body on the one surface of the reinforcing body in the thickness direction by using a first metal mold and a process of molding the other-side gasket body on the other surface of the reinforcing body in the thickness direction by using a second metal mold, wherein the first metal mold includes a first split mold and a second split mold and includes a structure sandwiching the reinforcing body between both the split molds, the first split mold includes a one-side gasket-body molding cavity to mold the one-side gasket body, and the second split mold includes a concave portion to form the convex shape on the reinforcing body, the second metal mold includes a first split mold and a second split mold and includes a structure sandwiching the reinforcing body between both the split molds, the first split mold of the second metal mold includes an accommodating space to accommodate the one-side gasket body, and the second split mold of the second metal mold includes another-side gasket-body molding cavity to accommodate the convex shape and to mold the other-side gasket body in a state where the convex shape is accommodated, and the convex shape is formed by deforming the reinforcing body along an inner surface of the concave portion by using a molding pressure when molding the one-side gasket body by using the first metal mold.

6. A method for manufacturing the gasket according to claim 4, the method comprising:

sequentially performing a process of molding the one-side gasket body on the one surface of the reinforcing body in the thickness direction by using a first metal mold and a process of molding the other-side gasket body on the other surface of the reinforcing body in the thickness direction by using a second metal mold, wherein the first metal mold includes a first split mold and a second split mold and includes a structure sandwiching the reinforcing body between both the split molds, the first split mold includes a one-side gasket-body molding cavity to mold the one-side gasket body, and the second split mold includes an uneven portion to form the bellows shape on the reinforcing body, the second metal mold includes a first split mold and a second split mold and includes a structure sandwiching the reinforcing body between both the split molds, the first split mold of the second metal mold includes an accommodating space to accommodate the one-side gasket body, and the second split mold of the second metal mold includes another-side gasket-body molding cavity to accommodate the bellows shape and to mold the other-side gasket body in a state where the bellows shape is accommodated, and the bellows shape is formed by deforming the reinforcing body along a surface of the uneven portion by using a molding pressure when molding the one-side gasket body by using the first metal mold.

* * * * *